3,014,800
MANUFACTURE OF A HARD, DRY FAT CONTAINING FEED PELLET
Elio J. Guidarelli, Minneapolis, Minn., assignor to Cargill, Inc., Minneapolis, Minn., a corporation of Delaware
No Drawing. Filed Apr. 10, 1958, Ser. No. 727,525
11 Claims. (Cl. 99—2)

This invention relates to pellets of feed or oil seed meal supplemented by the addition of fat or other nutrient material and to the method of production of such supplemented pellets. More particularly, this invention relates to the production of hard dry high fat feed pellets containing more than 4 percent and up to 20 percent of fat.

Pelletized feeds have long been known and are recognized as serving useful purposes in the field of animal nutrition. Such pelletized feeds have been produced by a variety of methods from a variety of ingredients. The principal additive to feeds to be pelletized has been fat. Heretofore, fat has been added to the feed mixture prior to the pelletizing operation and the mixture was then heated and forced through the die of a pellet mill. The drawbacks to this method are that the amount of fat which may be added in this manner is limited and the pellet is of extremely poor structural quality when the fat content approaches about 4 percent. The resultant pellets are soft and disintegrate readily into meal with the amount of fines ranging up to 45 to 50 percent. Such soft pellets are not of marketable quality. When attempts have been made to pellet a feed mixture with as much as 10 percent added fat an undesirable soft stringy product with a greasy surface results. Under normal warehouse storage conditions these pellets are completely deformed to a pulpy mass. It has not heretofore been possible to produce a practical marketable feed pellet with more than 4 percent added fat.

It has now been discovered that hard dry feed pellets with a total fat content of up to 20 percent can be easily and successfully produced by adding the supplemental fat by spraying liquid fat onto hot pellets and mechanically agitating to evenly coat each pellet with fat. It has been found that the fat coating applied in this manner is evenly and thoroughly absorbed into the pellet. The pellet may be provided with a high added fat content without decreasing the pellet hardness. The product is dry and non-greasy. Fewer fines are present since the pellets are more tightly bound. Tests have shown that these high-fat pellets are more palatable than other feeds and a feed conversion of 1.86 has been obtained. The physical characteristics of the high-fat pellet allow it to be more easily handled. These pellets may be broken into smaller pieces, generally by rolling, to produce "crumbles" with minimum production of fines. Waste is reduced since fowl, for example, prefer pellets and "crumbles" to fines.

According to the process of this invention, the feed mixture to be pelleted is first heated in the range of about 105° to 125° F. and moistened to a total moisture content of about 10 to 15 percent (dry basis) by blowing steam into the feed mixture in the mixing chamber of a conventional pellet mill. The heated and moistened feed mixture is discharged from the mixing chamber into the pelleting die and cut off into lengths of desired size. The pellets are then discharged at a temperature from about 125° to 150° F. into an agitating conveyor where they are sprayed while still hot with liquified fat and mixed and tumbled to evenly distribute the fat on the surface of the pellets. In the course of the mixing, the fat or oil on each pellet is completely absorbed into the pellet to produce a dry non-greasy product which, unexpectedly, is as hard as or harder than similar pellets made with no added fat.

By this method, hard, dry feed pellets with a total fat content of up to 15 percent may be easily and successfully produced and with an extended absorption time, a hard dry pellet with up to 20 percent fat can be produced. Production of feed pellets with such high fat content by previously known conventional pelleting methods is utterly impossible. Feed pellets made by this process can be successfully crumblized; that is, cracked between a set of rolls to produce a product which passes through a six mesh screen but is retained by a 12 mesh screen. In crumblizing high fat pellets made according to my process, the average amount of fines produced averaged only 3 per cent.

Exemplary feeds which are pelleted include such substances, as coconut meal, soybean meal, flaxseed meal, cottonseed meal, alfalfa meal, pulverized oats, corn, standard middlings, rice bran, fish meal, and the like. These materials are often made up as mixtures of several different feed substances and are often supplemented by other nutrients such as molasses and the like. The natural oil is removed from coconut meal, soybeans, flaxseed, etc. as for example, by crushing or solvent extraction. The meal which is a waste product from the extraction process contains some minor percentage of residual fat or oil. This residual fat content usually ranges less than about 3 to 4 percent. It is desired to add supplemental fat to increase the nutrient value of the feed and to improve its palatability as well.

Exemplary glycerized fats which may be added to the feed pellets include tallow, lard, grease, corn oil, cottonseed oil, soybean oil, linseed oil, fish oils, rice bran oil, etc.; related residual by-products obtained in the refining of fats, such as soap stocks, gums and foots; and fatty acids. Supplemental fatty acids may include any of the series of saturated or unsaturated acids which appear in fats, such as stearic, palmitic, oleic, linoleic, etc.

The fat substances must necessarily be liquified for spraying and preferably are maintained at a temperature between about 150° to 200° F. In general, the use of fat or oil at a lower temperature requires a somewhat longer absorption time. Typical absorption times range from about 1 to 5 minutes. It will be recognized that this time will vary dependent upon pellet size, amount of fat sprayed onto the pellets, temperature of the pellets and temperature of the fat, etc.

The process of the invention is illustrated by the following example:

A copra feed mixture to be pelleted was introduced in a continuous stream into the mixing chamber of a 50 H.P. California flat bed pellet mill and was there heated to about 115° F. and moistened to a total moisture content of about 15 percent (dry basis) by 100 p.s.i. steam which condensed as it was blown into the feed mixture in the mixing chamber of the pellet mill. The heated and moistened feed mixture was discharged from the mixing chamber into the die of the pellet mill at a rate of about 3 tons per hour. The mixture was forced through the 9/16" holes in the die and cut into 3/8" lengths. The temperature of the pellets as they left the pellet mill was about 135° F. The pellets were then discharged directly into a 9" paddle conveyor 6' long and fitted at its upstream end with two 110° nozzles with a capacity of 0.3 gallon per minute. Liquified tallow was continuously supplied to a two gallon fat container fitted with a steam coil to maintain the fat at about 195° F. and maintained at 80 p.s.i. with compressed air in order to force the melted fat through the spray heads. The tallow was sprayed onto the hot pellets in the conveyor as they passed beneath the spray nozzles. At the same time, the paddle conveyor agitated and tumbled the pellets to provide an even distribution of fat on the surface of the pellets. The conveyor was operated at a rate such that the coated pellets were subjected to the mixing and agitating process for a period of about 1½ minutes during which time the fat was completely absorbed into the pellet resulting in a dry hard product. Upon discharge from the conveyor the pellets were immediately cooled. The total fat content of the resulting product was 9.8 percent.

By practice of this process, pelleted laying rations, turkey rations, and broiler rations have been made containing up to 20 percent fat by extending the absorption time to from 2½ to 5 minutes. Hard dry copra meal pellets containing up to 15 and 20 percent fat have been successfully made by this process. A vibrating conveyor has been used successfully instead of a paddle or screw conveyor. The pellets and crumbles produced by this process have presented no problems in storage in spite of wide variations in both temperature and humidity. They did not break up in storage nor did they become tacky or greasy. Where high fat crumbles are desired the pellets may be passed through breaking rolls either before or after spraying of the added fat values.

The strength of the pellets produced by the process of this invention is illustrated in the table:

| Type of Pellet | Strength in Pounds | |
| --- | --- | --- |
|  | No Fat Added | 10% Fat Added |
| Turkey Grower | 4.6 | 5.2 |
| 20% Egg Mash | 4.4 | 4.8 |
| Extracted Copra Meal | 4.1 | 10.1 |

Extracted copra meal pellets containing 15 percent fat had a strength of 21.2 pounds.

It is apparent that many modifications and variations of this invention as hereinbefore set forth may be made without departing from the spirit and scope thereof. The specific embodiments described are given by way of example only and the invention is limited only by the terms of the appended claims.

I claim:
1. The process of manufacturing hard dry high-fat feed pellets having a fat content greater than about 4 percent which comprises forming the feed into pellets, then coating said pellets with a uniform distribution of liquified fat while the pellets are hot, and holding said pellets to permit the pellets to absorb the fat prior to cooling.

2. A process according to claim 1 further characterized in that said feed pellets are formed by extrusion at a temperature from about 125° to 150° F. and said liquified fat is immediately sprayed upon said pellets while the fat is at a temperature between about 150° to 200° F. upon said pellets.

3. A process according to claim 1 further characterized in that said spray coated feed pellets are agitated for from about 1 to 5 minutes to uniformly and thoroughly distribute said fat through said pellets.

4. A process according to claim 1 further characterized in that from about 3 to about 16 percent by weight of fat is added to the pellets to produce high-fat feed pellets having a total fat content from more than about 4 percent up to about 20 percent.

5. A process according to claim 1 further characterized in that said feed mix is heated to between about 105° to 125° F. and about 10 to 15 percent moisture is added by blowing steam into the feed mixture to be pelleted.

6. A process according to claim 1 further characterized in that said pellets are broken into particles of size that will pass through a six mesh screen and be retained by a 12 mesh screen.

7. A process according to claim 1 further characterized in that said fat is selected from the group consisting of animal oils, vegetable oils, fat refining by-products and fatty acids.

8. A process according to claim 1 further characterized in that said feed is an oil seed meal.

9. A process of making hard dry high-fat feed pellets containing more than about 4 percent and up to about 20 percent fat content which comprises subjecting an oil seed meal feed material to steam under pressure to heat the feed to from about 105° to 125° F. and to add from about 10 to 15 percent moisture to the feed, extruding said feed material into pellets having a temperature from about 125° to 150° F., agitating said pellets and simultaneously spraying the hot pellets with a liquified fat selected from the group consisting of animal oils, vegetable oils, fat refining by-products and fatty acids maintained at a temperature between about 150° to 200° F. and agitating said sprayed pellets for from about 1 to 5 minutes to uniformly and thoroughly distribute said sprayed fat through the pellets to produce a hard dry high-fat product.

10. A process of making hard and dry high-fat feed pellets containing more than about 4 percent and up to about 20 percent fat content which comprises heating said feed material to from about 105° to 125° F., adding about 10-15 percent moisture to the feed, immediately extruding said feed material into pellets, immediately agitating said pellets and simultaneously spraying the pellets with a liquified fat selected from the group consisting of animal oils, vegetable oils, fat refining by-products and fatty acids, said liquified fat maintained at a temperature between about 150° to 200° F., and agitating said sprayed pellets to uniformly and thoroughly distribute said sprayed fat through the pellets to produce a hard dry high-fat product.

11. The process of manufacturing hard, dry, high-fat feed pellets having a fat content greater than about 4 percent which comprises forming the feed into pellets, coating said pellets with a uniform distribution of liquified fat while the pellets are at a temperature of 125°–150° F., and holding said pellets to permit the pellets to absorb the fat prior to cooling.

References Cited in the file of this patent
UNITED STATES PATENTS

| 201,878 | Grivei | Apr. 2, 1878 |
| 2,168,532 | McMath et al. | Aug. 8, 1939 |
| 2,945,764 | Lanz | July 19, 1960 |

OTHER REFERENCES

Jensen: Feedstuffs, Dec. 7, 1957, pp. 72–75.